United States Patent Office 3,549,323
Patented Dec. 22, 1970

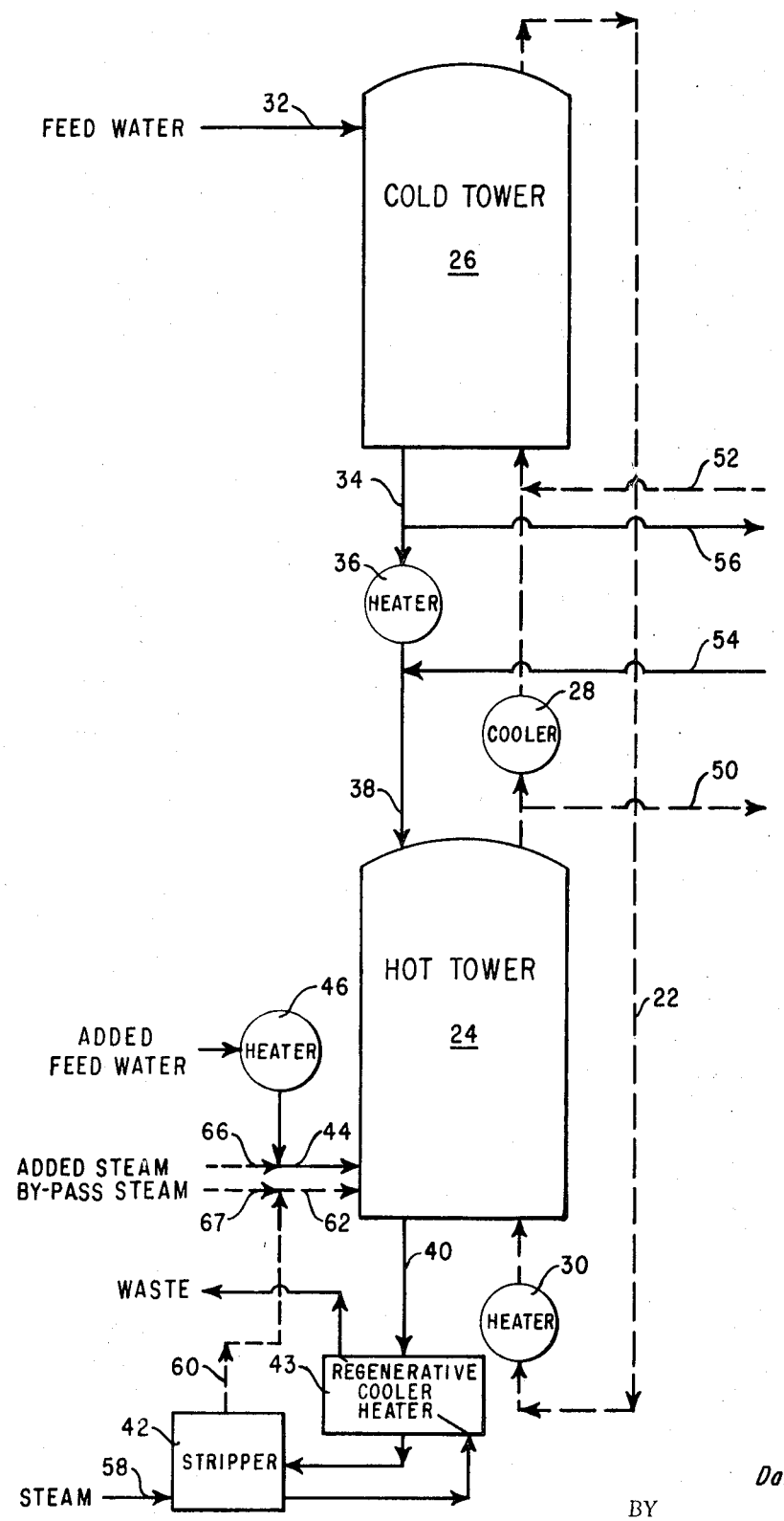

3,549,323
DUAL TEMPERATURE ISOTOPE EXCHANGE PROCESS
Dale F. Babcock, Wilmington, Del., assignor to the United States of America as represented by the United States Atomic Energy Commission
Filed Apr. 16, 1968, Ser. No. 721,676
Int. Cl. B01j *1/00;* C01b *5/02*
U.S. Cl. 23—204      4 Claims

ABSTRACT OF THE DISCLOSURE

A liquid and a gas each containing a desired isotope flow countercurrently through two liquid-gas contacting towers. The towers are maintained at different temperatures to enrich the liquid in the isotope at one temperature and the gas in the isotope at the other temperature. Liquid, having the natural concentration of the desired isotope, is fed into the top of the tower in which the liquid is enriched, and as an additional feed into the lower portion of the tower in which the gas is enriched. The latter feed results in a significant increase in productivity.

BACKGROUND OF THE INVENTION

The invention described herein was made in the course of or under contract AT(07-2)-1 with the U.S. Atomic Energy Commission.

This invention relates to an improvement in the dual-temperature, isotope exchange process for concentrating an isotope of an element by its exchange between two substances at two temperatures. This process has been of major importance in the manufacture of heavy water.

In the breadth of application of the dual-temperature isotope exchange process to which the instant invention relates, a system is employed which comprises one or more stages of pairs of hot and cold liquid-gas contacting towers wherein two substances are made to flow in countercurrent relationship. One of the two substances is fed to the first stage of the system, enriched in the isotope to be concentrated by preferential isotope exchange in the first of the pair of towers of that stage, depleted in the isotope in the second tower to below the feed concentration and discharged from the system as waste. The other substance is continuously circulated through the system as the separating agent in an essentially closed recycle flow. A portion of the flow of one of the substances is withdrawn from that portion of the system in which its concentration of the isotope is high. In the application of the process to the concentration of heavy water, the deuterium isotope is exchanged between water feed and continuously circulated hydrogen sulfide gas to attain concentration of the deuterium in the water.

Heavy water, deuterium oxide ($D_2O$), is useful as a moderator for nuclear reactors. It has been most commonly obtained from natural water where its concentration, or more correctly, the ratio of deuterium atoms to the total hydrogen atoms present, is only about one part in 7,000. This very dilute concentration and the similarities of the properties of $D_2O$ with $H_2O$ makes heavy water expensive to produce. This is true even though produced, as at present, in commercial scale quantities of hundreds of tons/year.

The production facilities which have produced nearly all of the free world's present supply of heavy water are described in considerable detail in A.E.C. R&D Report DP-400: Production of Heavy Water—Savannah River and Dana Plant—Technical Manual, W. P. Bebbington and V. R. Thayer, eds., J. F. Proctor, comp., Du Pont Co., Aiken, S.C. (1959) and by "Production of Heavy Water," by W. P. Bebbington and V. R. Thayer, Chemical Engineering Progress, vol. 55, No. 9, pp. 70–78 (September 1959).

The process practiced at the Savannah River production facilities (and at the Dana facilities until their shutdown in 1957) is a specific application of the dual-temperature, isotope exchange process. It has come to be known as the "GS" process and will be referred to as such hereinafter. The principles governing it are now well known and are fully explained in the above references and also in U.S. Pat. No. 2,787,526 entitled, "Method of Isotope Separation," issued Apr. 2, 1957 to J. S. Spevack, assignor to the U.S. Government. The brief summary of these principles in the paragraphs immediately following will facilities an understanding of the invention.

While water is a compound of hydrogen and oxygen represented by the formula $H_2O$, any body of naturally occurring water contains a significant quantity of hydrogen-oxygen compounds wherein one of the hydrogen atoms is the heavier isotope deuterium. This is expressed by the formula HDO. (At higher concentrations of deuterium, the isotopic form $D_2O$ becomes significant.) In naturally occurring water about $\frac{1}{7000}$ of the hydrogen atoms present are the deuterium isotope. Similarly, hydrogen sulfide while mostly $H_2S$, also contains a measurable quantity of the isotopic form HDS.

When hydrogen sulfide gas and liquid water are intimately contacted, there is a rapid equilibration of the deuterium isotope between oxygen compounds and sulfur compounds thereby fixing the relative proportions of $H_2O$, HDO, $H_2S$ and HDS. Deuterium has a substantial preference for combination with oxygen rather than sulfur. However, this preference is stronger at a low temperature than at a higher temperature. This may be conveniently expressed by the equation

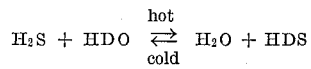

$$H_2S + HDO \underset{\text{cold}}{\overset{\text{hot}}{\rightleftarrows}} H_2O + HDS$$

This difference in the equilibrium distribution of deuterium at different temperatures is the mechanism that the GS process exploits to effect concentratiton of $D_2O$.

In the GS process, water flows down through a cold tower and then through a hot tower in countercurrent relation to an upward flow of hydrogen sulfide gas. The water is progressively enriched in deuterium as it passes downward through the cold tower and progressively depleted in deuterium as it passes downward through the hot tower. Conversely, the hydrogen sulfide stream is enriched in deuterium as it passes upward through the hot tower and depleted in deuterium as it passes upward through the cold tower. Accordingly, the concentration of deuterium in each of the streams is maximum at the bottom of the cold tower and at the top of the hot tower, or figuratively speaking, between the towers. A portion of the enriched water between the hot and cold towers is withdrawn as product, or carried forward for further processing, the depleted water disposed of as waste, and the hydrogen sulfide stream continuously recycled as the separating agent.

The capital investment in equipment necessary for practicing the GS process is very high. The capital investment at the Dana and Savannah River plants amounted to about $120.00 per "annual pound" for the GS portion of the plants alone. Enormous quantities of fluids must be handled. Heretofore, extraction of about 20% of the deuterium in the feed water has been considered to be the economic rate. At that recovery rate, about 35,000 pounds of water must be fed for every one pound of $D_2O$ recovered. The gas flow rate per pound of $D_2O$ produced is even greater. Heretofore, about 140,000 pounds of gas has been cycled between the towers for every pound of $D_2O$ extracted. As will be readily appreciated by those familiar with the chemical engineering aspects of the GS process, it is this enormous gas flow that largely determines the size of the towers and other required equipment, the energy input per unit of product, and accordingly, the cost of the $D_2O$ produced. By far the largest portion of the energy consumed by the process is related to the heat reversals and attendant loss of nonrecoverable heat associated with this enormous $H_2S$ gas flow. The incentive in increasing the productivity of the process, and particularly with relation to the gas flow is, therefore, apparent.

The relationship of the liquid and gas flows, however, must be controlled within narrow limits in order for the process to be productive. As explained in A.E.C. R&D Report DP-3: S-Process Pilot Plant—First Run Results and Process Principles, D. F. Babcock, C. B. Buford, Jr., and J. W. Morris, Du Pont Co., Wilmington, Del. (1951), and further elucidated in J. W. Morris and W. C. Scotten, Chemical Engineering Progress Symposium Series, vol. 58, No. 39, (1962), variation from optimum liquid-gas ratios ($L/G$) by as little as 5% in either direction drastically decreases productivity of the plant.

I have found, however, that the productivity of the GS process can be significantly improved by purposely violating—and by more than 5%—the optimum $L/G$ ratios given in the above references in certain portions of the system. Since the improvement is obtained without any significant increase in the gas flow rate, the gain in productivity is obtained with only minor additional equipment and at economically advantageous per unit operating costs.

SUMMARY OF INVENTION

It is an object of this invention to increase the productivity of the dual temperature isotope exchange process. It is a further object of this invention to increase the productivity of that process by modification of the system that requires relatively little additional equipment and achieves the increase in productivity at economically attractive per unit operating costs. It will be understood that while as a matter of convenience the invention is described herein in relation to the specific application of the dual temperature isotope exchange process wherein the concentration of deuterium is effected by its exchange between $H_2S$ and $H_2O$—which at present is the only economically significant application of the process—the invention has general application to the dual temperature isotope exchange process. This general application of the invention will be readily appreciated by those familiar with this process.

While as mentioned above and more fully developed in the identified report, DP-3, and Morris and Scotten paper, operation of each tower within a narrow limit of a fixed optimum $L/G$ ratio has been considered essential to the operability of the GS process, I have found that while this is true in a general sense, departure from the fixed $L/G$ ratios at particular limited locations in particular manner, is not only permissible, but actually increases the productivity of the process. The particular location to which the invention of the instant application is directed is the lower portion of the first stage hot tower. My copending applications Ser. No. 721,674 and Ser. No. 721,675, each entitled, "Improvement in Dual Temperature Isotope Exchange Process," and each filed on Apr. 16, 1968 are directed to other particular locations.

According to the instant invention, increased productivity, realized as increased production or higher concentration product, or both, is obtained by increasing the flow of water through the lower portion of the first stage hot tower by the introduction thereto of an additional flow of water having a natural concentration of deuterium. In a broader sense, the increased productivity of the dual-temperature isotope exchange process is obtained by increasing the flow of the feed substance through that portion of the first stage of the system wherein the concentration of the desired isotope in the feed substance is depleted below what it was when fed to the system, the increased flow being accomplished by the introduction of an additional flow of the feed substance to that portion.

The effect of this increased flow of water through the lower portion of the hot tower of the GS system due to the additional stream of feed water containing natural abundance of deuterium is to increase the deuterium concentration in the liquid on all plates subsequent to the added water feed point. The additional concentration of deuterium in the liquid drives more deuterium into the vapor and therefore more deuterium is carried into the system above the added water feed point into the cold tower, thus allowing recovery of more product.

While the optimum rate of added water and the optimum location of the feed point therefor depend upon process conditions and parameters relating to a particular plant—as will be more fully explained hereinafter—generally speaking, added water rates which increase the flow through the bottom portion of the first stage hot tower by 5% to 200%, and location of the feed point therefor at a point in the tower where the deuterium concentration in the process liquor is the same as that in the added water are of particular relevance to the instant invention.

While the foregoing briefly summarizes the invention and its objects and advantages, these and additional objects and advantages will appear and the summarized explanation of the invention understood from the following description of an embodiment thereof, and the most novel features of the invention will be particularly pointed out hereinafter in connection with the appended claims.

BRIEF DESCRIPTION OF DRAWING

The single figure of drawing is a schematic diagram showing the flows of $H_2O$ and $H_2S$ in accordance with the invention in an otherwise conventional GS process.

DESCRIPTION OF PREFERRED EMBODIMENTS

Referring to the drawing, the flow of the liquid water and hydrogen sulfide gas in accordance with the invention is illustrated in diagrammatic manner. For ease in understanding the flow of these substances, the components of the heat recovery loops have been omitted and the required changes in enthalpy in the various streams are indicated simply as heaters and coolers in the respective flow lines. Conventional items such as gas blowers, liquid pumps, valves, etc., have been omitted from the drawings since their use will be readily understood by those familiar with chemical engineering processes. While the drawing shows the flows of water and $H_2S$ according to the invention in the first stage of a plural stage GS process arrangement, the invention is equally applicable for single or plural stage arrangements, although as a matter of economic practicability a GS process production facility would most likely be a plural stage arrangement. The liquid water flows are represented by solid lines and the $H_2S$ gas flows by conventional dotted lines throughout.

With the exception of the improvement according to the invention, which will be specifically pointed out hereinafter, the drawing is a conventional flow sheet for the GS process. An essentially closed cycle 22 of $H_2S$ gas circulates upwardly through hot tower 24, cold tower 26 and then returned to hot tower 24. The structure of liquid-gas contacting towers 24 and 26 may be of any suitable design well known in the chemical engineering art. The $H_2S$ gas is cooled before entry into cold tower 26 and heated and humidified prior to its return to hot tower 24. These changes in enthalpy are figuratively represented by cooler 28 and heater-humidifier 30. While heater-humidifier 30 has been shown as being separate from hot tower 24, those familiar with the GS process will recognize that the heater-humidifier can be physically incorporated into the bottom of the hot tower. However, this physical incorporation of the heater-humidifier into the hot tower is merely a matter of engineering convenience and, generally, the functions of the two sections remain distinct. Similarly, a dehumidifier section could be physically incorporated in the bottom of the cold tower to wholly or partially effect the required change in enthalpy figuratively represented by cooler 28 (and/or heater 36).

The usual feed water stream, after suitable preconditioning as may be required by equipment not shown, enters the top of cold tower 26 through conduit 32. The usual temperature for the cold tower is about 30° C. As this water flows down the cold tower it is sequentially contacted by the countercurrent flow of $H_2S$ gas, such contacting being enhanced by any suitable means, such as packing material, contacting trays, etc., in the towers. The water is continually enriched in deuterium as it proceeds through cod tower 26 due to the higher perference of the deuterium isotope to combine with oxygen than with sulfur. Conversely, the $H_2S$ gas is continuously depleted in deuterium as it proceeds up the cold tower in countercurrent relation to the water. The enriched water exits cold tower 26 through conduit 34, and is heated by suitable means shown figuratively as liquid-heater 36 to about hot tower temperature, most usually about 140° C. The water enters the top of hot tower 24 through conduit 38 and as it proceeds down the hot tower it is continuously depleted in deuterium content due to the relatively lower preference of the deuterium for the oxide form at the higher temperature. Water depleted in deuterium is discharged from the bottom of the tower through conduit 40 and after necessary stripping of the $H_2S$ gas dissolved therein, such as in stripper 42, and heat removal by useful work such as by regenerative heating of other streams (illustrated figuratively by regenerative cooler-heater 43) the water depleted in deuterium is discharged to waste.

The described first stage may be coupled to a subsequent stage or stages, not shown, by cascading a portion of the gas flowing between the first stage towers. Hot, humidified gas enriched in deuterium is carried forward to the bottom of the second stage hot tower through conduit 50 and cold gas is returned from the top of the second stage cold tower via conduit 52. Excess water may be returned to the first stage through conduit 54. This manner of coupling the stages through the gas flow is fully described in copending U.S. application S.N. 630,486 to Victor R. Thayer, assignor to the U.S. Government, filed Apr. 11, 1967, and issued Nov. 19, 1968 as U.S. Patent 3,411,884. As an alternative, coupling of the stages by the cascade flow of a portion of both streams may be accomplished by the addition of water conduit 56.

Up to this point the described process flow sheet is that of a conventional GS process. To this conventional flow sheet is added the feed of a water stream to the lower portion of hot tower 24 through conduit 44. This additional feedwater entering hot tower 24 through conduit 44 would oridinarily be obtained from the same source of naturally occurring water as the feedwater entering the top of cold tower 26 through conduit 32, although as will be pointed out hereinafter, this need not be the case. Since it enters the system at the hot tower, it is brought to hot tower temperature by suitable arrangement, shown figuratively as heater 46.

For optimum results, added feed water stream 44 should be introduced into hot tower 24 on that tray at which the deuterium concentration in the process liquor is the same as that in the added water (after steady state has been achieved for the particular feed rate of added water in combination with the selected product draw-off rate). The total quantity of deuterium on that tray, at any instant of time is directly increased as a function of the added water rate. Similarly, the total deuterium and the concentration of deuterium in the liquid on every tray below the added water feed point will be increased as a function of the added water rate. Therefore, the ascending hot $H_2S$ stream entering the bottom of hot tower 24 containing a deuterium concentration approximately in equilibrium with water of natural enrichment at cold tower temperature, is equilibrated at the higher temperature with water of higher deuterium concentration than is the case without the added water. This drives more deuterium into the gas stream thereby increasing the absolute quantity of deuterium put into the system by the stripping action of the ascending gas stream in that portion of the system wherein the process water is depleted in deuterium to below feed water concentration. This increase in deuterium input to the system resulting from added water stream 44 may be withdrawn from between the towers as higher concentration product and/or increased quantity of enriched product.

The location of the optimum added water feed point is not fixed, but is a function of the added water rate in combination with the product draw-off rate and other process conditions. This will be clear from the following consideration of the two limiting cases. To facilitate this consideration, these cases will be described with reference to the Savannah River Heavy Water Plant arrangement described in detail in above referenced report, DP–400.

The hot tower of the first stage of the Savannah River plant has 60 actual trays which directly participate in the exchange reaction. (Total trays in the hot tower number 70, but the ten bottommost trays mak eup a humidifier section incorporated in the tower as a matter of engineering convenience and are not of direct interest here.) With the normal operation of the plant in accordance with the parameters detailed in the above referenced DP–400 report, and without additional feed to the lower portion of the hot tower as described herein, the process water flowing down the hot tower is returned to approximately the deuterium concentration it contained when introduced into the top of the cold tower as feed on the sixteenth tray from the bottom, i.e., sixteen trays above the humidifier section.

If an additional stream of feed water of infinite size were introduced to any one of the bottom sixteen trays of the lower portion of hot tower at 44, the water discharged from the bottom of the tower would have the same deuterium concentration as the feed water. This would be true because the deuterium concentration of the infinite stream could not be lowered any perceptible amount by the removal of the relatively small quantity of deuterium atoms therefrom by finite $H_2S$ stream 22. Since no depletion in the deuterium concentration of the infinite additional stream can occur in tower trays below that tray at which the stream is introduced, the optimum location for introducing an added water feed stream of infinite size would be onto the bottom tray of the hot tower.

To consider now the other limiting case, the addition of feed water streams of very small size to the hot tower would cause little change to the normal distributions of deuterium concentration throughout. The optimum position for introducing additional feed water streams of very small size to the hot tower, then, would be at that tray at which the deuterium concentration in the process water was the same as the deuterium concentration in the feed water before the addition. Again, in terms of the Savannah River plant, very small additions would be made on the sixteenth tray from the bottom.

The optimum locations for water additions at intermediate rates fall between the locations for the limiting cases just presented. Since only a relatively small portion of the hot tower is involved—for instance, 16 plates out of a total of 60 for the Savannah River plant—the optimum locations can be determined by empirical means without any undue difficulty. The plant can be operated for a period of several days with the added water stream entering at one location, and the productivity measured. Repeating this procedure for several locations will shortly reveal the optimum location for a particular rate of feed-water addition.

It will be appreciated that at least some increased productivity can be obtained through added water feed to the lower portion of the hot tower even though introduced at a less than optimum location. However, little benefit could be obtained by added water feed introduced at a point higher than about the lower one third of the hot tower in any conceivable economically practicable application of the GS process.

The amount of increased production attainable through added water feed to the lower portion of the hot tower is a function of the increase in the flow rate of process liquor through that lower portion. The theoretical increase is about 13% for an additional feed stream of infinite size introduced at the optimum location in the hot tower of a plant such as the Savannah River plant referenced above. For more practicable applications to that same plant, if the added water rate is increased by a flow 200% as large as that fed to the cold tower, then the increase in recovery of $D_2O$ as a result of this water addition will be about 10%, if the flow is increased by 50% of the cold tower feed rate, the increase in recovery will be about 7%, and an added water rate that increases the flow in the lower portion by 10% will increase recovery by about 2%.

The optimum rate of added water feed to the lower part of the hot tower of a particular GS plant to obtain the corresponding increase in productivity will depend upon such factors as the cost of steam, the cost of heat exchange, and specific process conditions relevant to that particular plant. While the determination of the optimum rate is clearly within the skill of the chemical engineering art, a few general remarks regarding factors involved in such determination will be helpful in placing it in proper perspective.

It will be appreciated that since the additional feed is introduced into the hot tower some cost will be involved in bringing it to hot tower temperature. Also, some preliminary treatment of the additional feed water may be necessary, although this may not be as critical as in the case of the usual feed to the top of the cold tower in view of the limited portion of the hot tower through which it will flow. In addition, the extra water added to the hot tower will directly increase the rate of water discharged from the system thereby directly increasing the quantity of water that will have to be stripped of dissolved $H_2S$ prior to its disposal and return to the natural environment. However, the major factor affecting the investment and operating costs, i.e., the $H_2S$ gas flow rate, remains the same after the addition as before. Accordingly, under certain conceivable—and by no means improbable—sets of conditions, added water according to the invention at a rate 200% as large as the water feed to the associated cold tower will be economically attractive.

At the other end of the range, since in most cases some minimum amount of additional equipment will be necessary to permit introduction of added water, as for instance, pumping, piping, and means to heat the added water, a minimum increase in productivity would undoubtedly be necessary to justify the use of added water in accordance with the invention. An added water feed rate about 10% as large as the feed rate to the associated first stage cold tower to gain an increase in productivity of about 2% is considered to be the practical lower limit. Accordingly, added water feed to the first stage hot tower in the range from 10% to 200% of the water feed rate to the associated cold tower are of particular relevance to the invention.

It is to be understood that the added water introduced into the bottom of hot tower 24 according to the invention, as at 44, is in addition to present stream additions thereto for the purpose of regulating the temperature of the normal flow, i.e., prior to added water. Prior designs have generally called for these steam additions to be introduced into the system at the stripper as at 58 on the drawing. The combined steam and $H_2S$ carried with it exit the stripper at 60 and are introduced into the hot tower at 62 onto that tray having matching deuterium concentration. Referring again to the Savannah River plant as a specific example, that particular tray is the fifth above the humidifier section.

In actual present practice at the Savannah River plant, the total steam input is divided into two streams, that entering the stripper at 58 and by-pass stream 67. The addition of by-pass stream 67 to the original design was due to the later operation of the hot tower at higher than design temperature and the then existing stripper being unable to accommodate the entire stream flow required thereby. Both steam streams 60 and 67 are presently introduced into the hot tower at 62 onto the fifth tray.

It will be appreciated that in accordance with principles of the instant invention, it will be of advantage to reduce the steam flow through stripper 42 to the minimum actually required to accomplish the desired degree of stripping and introduce as much as practicable of the remaining portion of required steam (having natural concentration of deuterium) onto the same tray to which added water 44 is fed. This is represented on the drawing by added steam line 66. The optimum distribution of the total required steam between introduction at the stripper and through line 66 will be readily determined by one skilled in the chemical engineering art in accordance with the above general discussion.

Although the greatest advantage can be gained from the improved flow diagram according to the invention in a production plant specifically designed to incorporate it, at least a portion of the advantages can be obtained from its application to existing GS plants. Liquid-gas contacting towers designed for a particular gas flow rate can generally accommodate a much larger liquid flow rate than that dictated by optimum $L/G$ ratios for the GS process with little or no modification of any significance. Assuming that the downcomers between trays are of adequate size, increased liquid flow would merely slightly increase the liquid head over the downcomer weirs.

Although as indicated above, added water 44 would ordinarily be obtained from the same source as the water entering the top of cold tower 26 through conduit 32, and accordingly, would be identical therewith with respect to deuterium concentration, these concentrations need not be exactly the same. For instance, since the process water flowing down hot tower 24 passes through a plate at which the deuterium concentration corresponds to that of the natural water fed to the system, all of the water could be fed to that plate and cold tower water feed obtained by a recycle flow of the water from the next higher plate (with necessary temperature adjustment, of course). It will be appreciated, however, that since the concentration of the recycle flow will be only one tray away from natural, it will be substantially at natural enrichment.

While the fundamental novel features of the invention have been shown and described and pointed out as applied to a preferred embodiment, it will be understood that various omissions and substitutions and changes may be made by those skilled in the art within the principle and scope of the invention as expressed in the appended claims.

What is claimed is:

1. In the dual-temperature, isotope-exchange process for concentrating an isotope of an element by its exchange between two substances containing said element, one in liquid and one in gas phase, in a system comprising at least one pair of liquid-gas contacting towers which are maintained at different temperatures and through which said substances are made to flow in countercurrent relationship, the liquid substance being:

fed to the first of the pair of towers constituting the first stage of said system at a first concentration of the isotope to be concentrated, enriched in concentration of said isotope by preferential isotope exchange in said first tower, depleted in concentration of said isotope by said exchange in the second of said pair of towers to below said first concentration in the lower portion of said second tower, and discharged therefrom as waste to the process, the gaseous substance being continuously circulated through said pair of towers in countercurrent relation to said liquid substance in an essentially closed recycle flow, said gaseous substance entering the bottom portion of each of said towers and leaving from the top portion thereof; and a portion of the flow of one of said substances being withdrawn from that portion of the system in which said isotope is concentrated therein;

the improvement comprising adding liquid substance having substantially said first concentration of said isotope to about a location within said second tower having liquid substance of not more than said first concentration of said isotope, said location being above said gaseous substance entrance, and said additional liquid substance being in an amount equal to about 5% to 200% by weight of said liquid substance of said first concentration fed to said first tower.

2. In the dual-temperature, isotope-exchange process for concentrating the deuterium isotope by its exchange between water and hydrogen sulfide in a system comprising at least one pair of hot and cold liquid-gas contacting towers through which liquid water and hydrogen sulfide gas are made to flow in countercurrent relationship, the liquid water being:

fed to the cold tower of the first stage of said system at substantially natural concentration of deuterium, enriched in deuterium concentration by preferential isotope exchange in the cold tower of said first stage, depleted in deuterium concentration by said exchange in the associated hot tower to below natural concentration in the lower portion of said hot tower, and discharged therefrom as waste to the process, the hydrogen sulfide gas being continuously circulated through said pair of towers in countercurrent relation to the liquid water in an essentially closed recycle flow, said hydrogen sulfide gas entering at the bottom portion of each of said towers and leaving from the top portion thereof; and a portion of the water flow being withdrawn from that portion of the system in which the deuterium is concentrated therein;

the improvement comprising adding liquid water having a natural concentration of deuterium to a location within said hot tower having liquid water of not more than about natural deuterium concentration, said location being above said hydrogen sulfide gas entrance, and said additional liquid water being in an amount equal to about 5% to 200% by weight of said liquid water having said natural concentration of deuterium fed to said cold tower.

3. The improvement according to claim 2 wherein said liquid water having a natural concentration of deuterium is added to about the lower third of the hot tower.

4. The improvement according to claim 2 wherein said additional liquid water having natural concentration of deuterium is introduced at about that level of the hot tower at which the concentration of deuterium in the process water is approximately the natural concentration of deuterium in water after the addition thereof with steady state operation.

References Cited

UNITED STATES PATENTS 2,787,526   4/1957   Spevack _____ 23—204

OSCAR R. VERTIZ, Primary Examiner

H. S. MILLER, Assistant Examiner

U.S. Cl. X.R.

23—283